UNITED STATES PATENT OFFICE.

SETON TERRY COLE, RUFUS B. AUSTIN, AND PETER L. BRIZENDINE, OF PORTLAND, TENNESSEE.

METHOD OF TREATING TOBACCO-PLANTS.

SPECIFICATION forming part of Letters Patent No. 534,095, dated February 12, 1895.

Application filed September 1, 1894. Serial No. 521,968. (No specimens.)

*To all whom it may concern:*

Be it known that we, SETON TERRY COLE, RUFUS B. AUSTIN, and PETER L. BRIZENDINE, citizens of the United States of America, residing at Portland, in the county of Sumner and State of Tennessee, have invented certain new and useful Improvements in Methods of Treating Tobacco-Plants; and we do hereby declare the following to be a full, clear, and exact description of the invention, such as will enable others skilled in the art to which it appertains to make and use the same.

This invention relates to an improved method of treating tobacco plants for the purpose of preventing the growth of suckers thereon; and it consists in the mode of treating the growing plants with a specific compound to accomplish this end, as will be hereinafter set forth.

In treating growing tobacco plants according to our method the operation is as follows: When the suckers make their appearance they are cut or broken from the stem and to the part of the stem from which the suckers are removed we apply our composition, which consists of salt and coal-oil preferably in the proportion of four ounces of salt to one gallon of coal-oil, the salt being dissolved in the coal-oil and the composition thoroughly mixed. When the composition is applied to the stem it will prevent further growth of the suckers and cause the strength of the plant to go to the leaves.

The composition is preferably applied by means of a medicine dropper, and in practice it has been found very effective, and not only entirely prevents the growth of the sucker but prevents bleeding at the point where the sucker was severed.

Having thus described our invention, what we claim as new, and desire to secure by Letters Patent, is—

The method of treating growing tobacco plants for preventing the growth of suckers thereon, consisting in severing the sucker from the stem and applying to the stem a composition composed of salt and oil well mixed in the proportions specified.

In testimony whereof we affix our signatures in presence of two witnesses.

SETON TERRY COLE.
    RUFUS B. AUSTIN.
    PETER L. BRIZENDINE.

Witnesses:
 A. G. BRADLEY,
 E. N. MEGOIAR.